United States Patent Office 2,900,375
Patented Aug. 18, 1959

2,900,375

METHOD OF MAKING GLUTATHIONE

Gaston Amiard, Noisy le Sec, Rene Heymes, Romainville, and Leon Velluz, Paris, France, assignors to UCLAF, Paris, France, a body corporate of France No Drawing. Application December 18, 1956
Serial No. 628,975

Claims priority, application France December 23, 1955

1 Claim. (Cl. 260—112)

This application relates to a process of preparing L-glutathione or γ-L-glutamyl L-cysteinyl glycine, a natural tripeptide of the formula

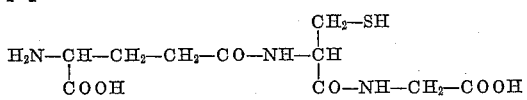

the phsiological importance of which has been demonstrated during the "Symposium of glutathione"—Proceedings held at Ridgefield, Connecticut, November 1953, New York Acad. Press, 1954.

Until now, this compound was not readily accessible. Broadly, the methods used include the employment of benzyl chloride as blocking agent of the mercaptan group. This generally produces a peptide corresponding to glutathione whose amino group is, however, blocked by a carbobenzoxy group and whose mercapto group is benzylated. Since hydrogenolysis cannot be applied to S-benzylated compounds, the mercaptan group of glutathione must be set free either by the action of sodium in liquid ammonia or by the action of phosphonium iodide, two methods which are not readily applicable on an industrial production scale.

The copending patent application Serial No. 527,634 of August 10, 1955, discloses the preparation of N-tritylated aminoacids and their use for the preparation of N-peptides by means of a mixed anhydride method and the copending patent application No. 594,106 of June 27, 1956, shows that N-tritylated amino acids can be readily converted into N-trityl peptides by reacting them with an amino acid ester in the presence of dicyclohexylcarbodiimide. The resulting N-tritylated peptide ester is then saponified and detritylated by means of hot aqueous acetic acid.

Finally, the likewise copending patent application Serial No. 596,151 of July 6, 1956, discloses the preparation of γ-glutamyl peptides by condensing N-trityl glutamic acid α-benzyl ester with the benzyl ester of an amino acid in the presence of dicyclohexylcarbodiimide. The acid groups of the N-tritylated L-glutamyl peptide are then set free by hydrogenolysis, and detritylation is carried out by means of hot aqueous acetic acid.

According to the present invention, L-glutathione is prepared from S,N-ditrityl L-cysteine, II, a compound which has not been previously described. As indicated by the following reaction scheme, this compound can be readily obtained by treating L-cysteine with trityl chloride in a mixture of water and a suitable solvent such as alcohol or ether and in the presence of an organic base such as diethylamine:

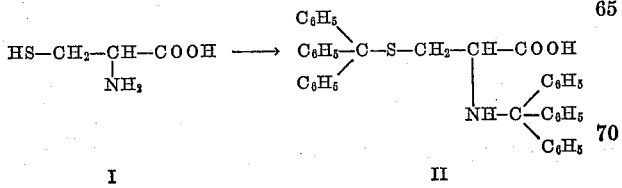

This eliminates the preparation of the ester of L-cysteine prior to the tritylation and the subsequent saponification thereof. The N,S-ditrityl cysteine is separated in form of the diethylamine salt which is insoluble in ether or alcohol. During the reaction, a small amount of S-trityl L-cysteine,

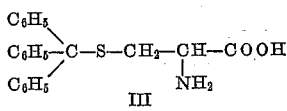

forms, which can be easily separated by taking advantage of its insolubility in ether.

N,S-ditrityl L-cysteine obtained from the diethylamine salt thereof is condensed with methyl, ethyl or benzyl glycinate in the presence of a disubstituted carbodiimide, such as dicyclohexylcarbodiimide, diisopropylcarbodiimide or methyl terbutylcarbodiimide. The nitrogen bound trityl group of the ester of N,S-ditrityl L-cysteinyl glycine,

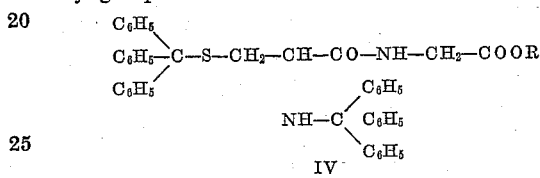

obtained in this manner, is removed by treating with dilute hydrochloric acid in acetone at room temperature or with hot aqueous acetic acid, resulting in the ester of the S-trityl compound

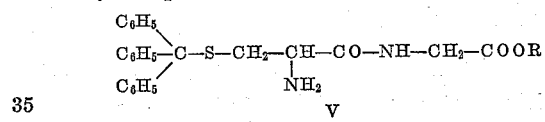

According to a specific feature of this invention, N-trityl L-glutamic acid,

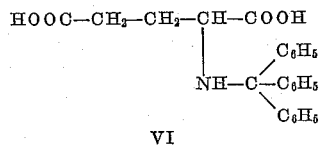

is then reacted with ethyl S-trityl L-cysteinyl glycinate to produce the ester of N,S-ditrityl L-glutathione,

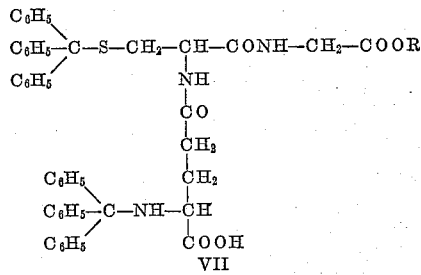

After saponification of the ester group, this compound is treated with hot aqueous acetic acid to produce S-trityl L-glutathione

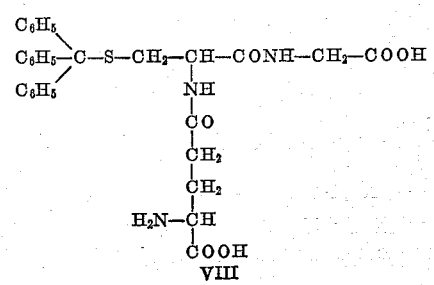

which, according to another particular feature of this invention, is freed from the sulfur bound trityl group by treating with a chloroform solution of gaseous hydrochloric acid to obtain glutathione,

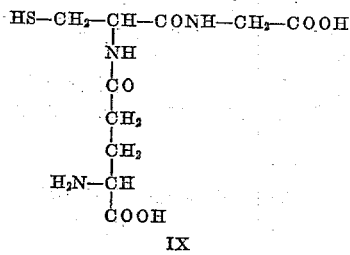

IX

The process is thus characterized by great simplicity, since a minimum number of steps is used and a single reagent for blocking sulfur and nitrogen. The outstanding features of the process are the selective removal of the N-bound trityl group by the action of hot aqueous acetic acid or hydrochloric acid in cold, dilute acetone solution, and the detritylation of S-trityl L-glutathione by means of gaseous hydrochloric acid in chloroform, reactions which can be carried out easily on a commercial scale and which do not cause racemization. Moreover, the process utilizes the condensation of the L-glutamic N-trityl acid with S-trityl L-cysteinyl glycine esters.

The following examples are furnished to illustrate, but in no way to limit the present invention:

EXAMPLE 1

*Preparation of N,S-ditrityl L-cysteine, II*

480 cc. of ether and 80 cc. of diethylamine are introduced into a 0° C. solution of 25 g. cysteine hydrochloride, I, $[\alpha]_D^{20}=+5.5°$ ($c=1\%$, N hydrochloric acid) in 480 cc. of water, while stirring and passing a stream of nitrogen through the solution. After cooling to $-5°$ C. and while continuously stirring, 120 g. of trityl chloride are rapidly added to the solution, and stirring is continued for three hours. The reaction mixture turns into a viscous mass which is rather difficult to stir. 150 to 200 cc. of chloroform are then added, and the aqueous phase, containing diethylamine hydrochloride and unreacted cysteine hydrochloride, is decanted. S-trityl cysteine esterified by trityl chloride as well as N,S-ditrityl L-cysteine in the form of its diethylamine salt and trityl ester remain in the organic layer which is washed with 300 cc. of water; the chloroform-ether solution is dried over sodium sulfate and, after filtration, concentrated to a small volume. 100 cc. of alcohol containing 1 cc. of diethylamine are added, and the solvent is distilled off until all the chloroform has been removed. The diethylamine salt of N,S-ditrityl cysteine, II, crystallizes. Crystallization is completed by gradually adding 100 cc. of ether. Cooling and separating and drying the precipitate produces 55 g. of the pure salt in form of needles, $[\alpha]_D^{20}=+71°\pm1$ ($c=2\%$, chloroform), soluble in chloroform, difficultly soluble in alcohol, insoluble in water and ether. The ninhydrine and sodium nitroprusside reactions are negative.

*Analysis.*—$C_{45}H_{46}O_2N_2S=678.91$. Calculated: 79.61% C; 6.83% H; 4.13% N; 4.72% S. Found: 79.4% C; 6.9% H; 4.0% N; 4.7% S.

This compound has not been previously described.

From the crystallization mother liquors, a second batch of the product is obtained which brings the total yield to about 70 g. Taken up with acidified water, the salt decomposes, forming free N,S-ditrityl L-cysteine, which is easily extracted by means of ether wherein it is sufficiently soluble. Evaporation of the ether produces the crude product in the amorphous state. The residue originating from the ether-alcohol mother liquor of the diethylamine salt of N,S-ditrityl L-cysteine, comprising the trityl esters of S-trityl L-cysteine and N,S-ditrityl L-cysteine is refluxed for 10 minutes with 50% aqueous acetic acid in ether. This produces a mixture of N,S-ditrityl L-cysteine and S-trityl L-cysteine of which the latter is insoluble in ether so that they can be readily separated from each other. S-trityl L-cysteine is purified by recrystallization in alcohol, resulting in needles, M.P. 202–205° C., $[\alpha]_D^{20}=+19\pm1$ ($c=2\%$, N/10 sodium). It is soluble in aqueous diluted alkalies, difficultly soluble in alcohol and aqueous diluted acids, insoluble in ether and water. Ninhydrine reaction is positive and sodium nitroprusside reaction is negative.

*Analysis.*—$C_{22}H_{21}O_2NS=363.47$. Calculated: 72.69% C; 5.82% H; 3.85% N; 8.82% S. Found: 72.8% C; 6.0% H; 3.6% N; 8.4% S.

EXAMPLE 2

*Preparation of ethyl S-trityl L-cysteinyl glycinate, V*

(a) *Condensation of N,S-ditrityl L-cysteine, II, with ethyl glycinate.*—13.6 g. (0.02 mol) of the diethylamine salt of N,S-ditrityl L-cysteine, described in Example 1, are dissolved in 50 cc. of chloroform. 20 cc. of N hydrochloric acid are added and the mixture is stirred to liberate the amino acid which passes into the chloroform layer. After decanting, the chloroform layer is dried over sodium sulfate, filtered, vacuum distilled to dryness and taken up with 20 cc. of methylene chloride. 2.5 g. of ethyl glycinate dissolved in 10 cc. of methylene chloride and 5 g. of dicyclohexylcarbodiimide are then poured into this solution while stirring. After standing overnight, 1 cc. of acetic acid is added in order to destroy excess dicyclohexylcarbodiimide. The dicyclohexylurea precipitate that forms is filtered off and is washed with methylene chloride. The filtrate and the wash liquid are combined in a separating funnel and washed first with N hydrochloric acid in order to eliminate unreacted ethyl glycinate, and then with water, ammonia and again with water. The methylene chloride solution is dried over sodium sulfate, filtered and evaporated to dryness. This produces approximately 16 g. of ethyl N,S-ditrityl L-cysteinyl glycinate, IV ($R=C_2H_5$) in form of a pulverulent crude product which, however, is sufficiently pure for the subsequently described operations.

(b) *Removal of nitrogen-bound trityl from N,S-ditrityl L-cysteinyl glycinate, IV.*—16 g. of derivative IV, obtained according to (a) are taken up with 40 cc. of acetone. 10 cc. of 5 N hydrochloric acid are added, and the solution is agitated at room temperature. At first, the solution becomes clear and slightly warm, but turns turbid upon the crystallization of triphenylcarbinol. After standing for 15 minutes, 10 cc. of water are added to the filtrate, and part of the acetone is distilled off. The remaining solution is diluted with 50 cc. of water, and ethyl S-trityl L-cysteinyl glycinate hydrochloride is extracted twice by means of chloroform. The combined chloroform extracts are dried over sodium sulfate, filtered and evaporated to dryness. Upon taking up the residue with 100 cc. of ether and 50 cc. of petroleum ether, compound V ($R=C_2H_5$) precipitates as a powder which is separated, washed with ether and dried. It is sufficiently pure for condensation with N-trityl glutamic acid. The yield is 8.4 g. of crude ethyl S-trityl cysteinyl glycinate hydrochloride V (or 86%, based on the N,S-ditrityl L-cysteine starting material).

Saponification of this product by means of heating for two minutes on a water bath after dissolving in 10 volumes of a normal alcoholic potassium hydroxide solution followed by acidification, filtration and recrystallization in aqueous alcohol produces S-trityl L-cysteinyl glycine in the form of colorless flakes; M.P. about 120° C. (dehydration), $[\alpha]_D^{20}=+17.5°\pm1$ ($c=2\%$, N/10 sodium in 90% methanol) (anhydrous product). The product dehydrates at 80° C. This new compound is soluble in chloroform and aqueous diluted alkalies, difficultly soluble in aqueous diluted acids and alcohol, insoluble in ether. It does not react with sodium nitroprusside.

*Analysis.*—$C_{24}H_{24}N_2O_3S=420.52$. Calculated: 68.54%

C; 5.75% H; 6.66% N; 7.62% S. Found: 68.3% C; 5.8% H; 6.4% N; 7.2% S.

EXAMPLE 3

Preparation of L-glutathione (a) *Preparation of N-trityl L-glutamic acid, VI.*—This acid is obtained by selective hydrogenolysis of dibenzyl N-trityl glutamate. 57 g. of dibenzyl N-trityl glutamate described in the copending patent application Serial No. 594,117 of June 27, 1956, are dissolved in 500 cc. of ethyl acetate. Palladium on charcoal (prepared by hydrogenation of a mixture of 15 g. of charcoal and 5 cc. of 20% palladous chloride in 200 cc. of water) and 27 cc. of triethylamine are added in order to bind the N-trityl glutamic acid liberated by the hydrogenolysis and to thereby avoid detritylation. Hydrogenation is continued until the theoretical amount of hydrogen is absorbed, which requires about forty-five minutes, the catalyst is separated and washed with ethyl acetate, the wash liquid is combined with the filtrate and is concentrated to approximately 100 cc. After cooling, the concentrate turns into a solid mass. 100 cc. of ether are added, the solution is separated, washed with ether and dried at 80° C. Part of the triethylamine is removed, leaving 32 g. of the triethylamine salt of N-trityl glutamic acid. Recovery from the mother liquor brings the total yield to 81% (40 g.). The acid salt recrystallizes in ethyl acetate in the form of needles, M.P.=100° C. (viscous), $[\alpha]_D^{20} = -32° \pm 2$ ($c=2\%$, chloroform). This new compound is soluble in water, chloroform and alcohol, insoluble in ether.

*Analysis.*—$C_{30}H_{38}O_4N_2 = 490.63$. Calculated: 73.44% C; 7.81% H; 5.71% N. Found: 73.2% C; 7.9% H; 5.5% N.

Taken up with chloroform and decomposed by adding the calculated amount of hydrochloric acid, the compound yields N-trityl glutamic acid, VI, in the amorphous state, $[\alpha]_D^{20} = +27.5° \pm 2$ ($c=2\%$, methanol). The same acid can be obtained by direct tritylation of L-glutamic acid in the presence of diethylamine under conditions similar to those described in Example 1 for the tritylation of cysteine, or by saponification of ethyl or γ-monomethyl N-trityl glutamate. This product yields well crystallized salts with diethylamine and L(+)-threo 1-p-nitrophenyl 2-amino propane 1,3-diol.

(b) *Condensation of N-trityl glutamic acid with ethyl S-trityl L-cysteinyl glycinate and saponification of the condensation product.*—18 g. of ethyl S-trityl L-cysteinyl glycinate hydrochloride, prepared according to Example 2(b), are dissolved in 50 cc. of methylene chloride. After washing the solution first with a slight excess of normal ammonia in order to remove the acid residue and then with water, drying over sodium sulfate and filtering, 9.5 g. of dicyclohexylcarbodiimide are added and 19.6 g. of the afore-described triethylamine salt of N-trityl glutamic acid. The mixture is left standing overnight and 2 cc. of acetic acid are added in order to destroy the excess dicyclohexylcarbodiimide. Dicyclohexylurea, which separates upon leaving the solution undisturbed for 15 minutes, is removed and washed with methylene chloride. The methylene chloride solution and washing are combined, washed first with 0.5 N hydrochloric acid and then with water, dried over sodium sulfate, filtered and evaporated to dryness. This produces the ethyl ester of crude N,S-ditrityl L-glutathione, VII, which is taken up with alcohol, part of which is distilled off in order to remove methylene chloride. While the remaining solution is heated in a water bath, 80 cc. of N sodium carbonate solution are gradually added. Saponification is completed in ten minutes. The solution is diluted with 200 cc. of water, cooled to room temperature, acidified with 81 cc. of normal hydrochloric acid and is extracted with chloroform. The chloroform extract is washed with water, dried over sodium sulfate, filtered and vacuum evaporated to dryness. This produces an amorphous residue, consisting of N,S-ditrityl L-glutathione.

(c) *Removal of nitrogen-bound trityl from N,S-ditrityl L-glutathione.*—The residue obtained according to (b) is taken up with 60 cc. of 50% aqueous acetic acid and heated in a water bath for five minutes. Triphenylcarbinol precipitates. The mixture is diluted with approximately 500 cc. of water and extracted with chloroform. The chloroform extract is washed with water, dried over sodium sulfate, filtered, passed through charcoal, and concentrated to a small volume. S-trityl L-glutathione, VIII, precipitated upon adding absolute alcohol, is separated and washed with alcohol and ether. After drying, 16 g. (or a yield of 70% based on the amount of starting materials) of crude S-trityl L-glutathione, VIII, are obtained in the form of a white pulverulent product.

(d) *Detritylation of S-trityl L-glutathione.*—5 g. of derivative VIII obtained according to (c) are dissolved in 50 cc. of anhydrous chloroform. Anhydrous gaseous hydrochloric acid is passed through the solution for several minutes. The solution becomes turbid, and crude L-glutathione hydrochloride, IX, precipitates. After adding 50 cc. of anhydrous ether and stirring, the hygroscopic hydrochloride is separated, washed with ether on a filter and dissolved in 10 cc. of distilled water. Amberlite IR4B is gradually added to this solution until the pH is 2. The ion-exchanging resin is filtered off, washed with water, and the filtrate, combined with the wash water, is vacuum concentrated in a water bath of 40° C. and under nitrogen, to almost dryness. The residue is taken up with 75% alcohol and placed in a desiccator until L-glutathione crystallizes. The product obtained after separation, washing with alcohol and drying is in every respect identical with natural L-glutathione.

It is, of course, possible to change the afore exemplified methods in certain respects without exceeding the scope of the herein disclosed invention. Thus, the nitrogen-bound and sulfur-bound trityl groups of N,S-ditrityl L-glutathione may be removed simultaneously. Racemic and enantiomorphous amino acids may be used as starting materials. Other solvents or another ester of S-trityl L-cysteinyl glycine than the ethylester, such as the methyl or benzyl ester, may be used or another disubstituted carbodiimide, such as diisopropylcarbodiimide or methyl terbutylcarbodiimide may be employed as condensing agent in lieu of dicyclohexylcarbodiimide.

The melting points stated in the examples are instantaneous melting points obtained by means of the heated block method.

We claim:

The method of preparing L-glutathione which comprises treating an aqueous solution of L-cysteine hydrochloride in the presence of ether and diethylamine with an excess of trityl chloride while stirring, adding chloroform, permitting the mixture to separate into two layers, recovering N,S-ditrityl cysteine in form of the diethylamine salt from the organic layer, dissolving the salt in chloroform, adding aqueous hydrochloric acid to decompose said salt, separating the mixture into two layers, recovering N,S-ditrityl L-cysteine from the chloroform layer, dissolving said compound in methylene chloride, adding a glycine ester of the group consisting of methyl, ethyl and benzyl glycinate, stirring, adding a disubstituted carbodiimide taken from the group consisting of dicyclohexylcarbodiimide, diisopropylcarbodiimide and methyl terbutylcarbodiimide as condensing agent, allowing the mixture to stand for several hours at room temperature, adding sufficient acid to destroy excess disubstituted carbodiimide, filtering, washing, recovering N,S-ditrityl L-cysteinyl glycinate from the filtrate, taking up said glycinate with acetone, treating the resulting solution at room temperature with dilute hydrochloric acid to remove nitrogen-bound trityl, recovering S-trityl L- cysteinyl glycinate hydrochloride, dissolving said compound in methylene chloride, washing the resulting solution with normal ammonia and water, adding thereto the triethylamine salt of N-trityl glutamic acid prepared by dissolving dibenzyl N-trityl glutamate in ethyl acetate and hydrogenating in the presence of palladium black and triethylamine; adding one of said disubstituted carbodiimides, allowing the mixture to stand for several hours at room temperature, adding sufficient acid to destroy excess disubstituted carbodiimide, filtering, washing, recovering N,S-ditrityl L-glutathione ethyl ester, dissolving said ester in alcohol, saponifying the dissolved ester by heating with a dilute alkaline solution, recovering N,S-ditrityl L-glutathione, taking up said compound with dilute acetic acid, heating the solution on a water bath to remove nitrogen bound trityl, recovering S-trityl L-glutathione, dissolving said compound in chloroform, treating the resulting solution with gaseous hydrochloric acid to remove sulfur-bound trityl, recovering L-glutathione hydrochloride, treating an aqueous solution of said compound with an anion-exchange resin to remove the hydrochloride and recovering L-glutathione.

References Cited in the file of this patent

FOREIGN PATENTS 1,100,016   France _____ Mar. 30, 1955

OTHER REFERENCES

Jones: J.A.C.S., vol. 50 (1928), pp. 1150–4.
Beilstein: Handbook of Org. Chem., vol. 12, p. 1344. 1st Supp. vol. 12, pp. 557–8. 2nd Supp. vol. 12, pp. 791–2.
Amiard et al.: Bull. Soc. Chim (France), No. 2 (1955), pp. 191–3.
Benary et al.: Berichte, vol. 57 (1924), pp. 1324–27.
Kunin et al.: Ion Exchange Resins (1950), pp. 132–35.
Sheehan et al.: J.A.C.S., vol. 70 (1955), pp. 1067–8.
Anson et al.: Advances in Protein Chemistry, vol. 5 (1949), pp. 25–32, 43, 62, 71–2.
Helferich et al.: Ber. Deut. Chem., vol. 58 (1925), pp. 882–6.
Khorana: J. Chem. Soc. (London) (1952), pp. 2081–8.
Wieland: Angew. Chem., vol. 63, No. 1 (1951), p. 12.
Elbs: Ber. Deut. Chem., vol. 17 (1884), pp. 701–6.